United States Patent
Vertaschitsch et al.

(10) Patent No.: US 6,976,217 B1
(45) Date of Patent: Dec. 13, 2005

(54) METHOD AND APPARATUS FOR INTEGRATING PHONE AND PDA USER INTERFACE ON A SINGLE PROCESSOR

(75) Inventors: Ed Vertaschitsch, Bellevue, WA (US); Sean Mercer, Issaquah, WA (US); Gordon Onorati, Kent, WA (US)

(73) Assignee: PalmSource, Inc., Sunnyvale, CA (US)

( * ) Notice: Subject to any disclaimer, the term of this patent is extended or adjusted under 35 U.S.C. 154(b) by 538 days.

(21) Appl. No.: 09/687,987

(22) Filed: Oct. 13, 2000

(51) Int. Cl.$^7$ .......................... G06F 3/00; H04M 11/00
(52) U.S. Cl. ...................... 715/717; 715/864; 715/771; 379/90.01; 379/93.19; 379/93.23; 379/110.01; 455/556; 455/575
(58) Field of Search ................................. 345/864, 771, 345/776, 716–718, 863, 963, 727, 978, 839; 379/90.01, 93.09, 93.05, 93.17, 93.19, 93.23, 110.01, 419, 441, 442, 456; 455/74, 556, 557, 566, 565

(56) References Cited

U.S. PATENT DOCUMENTS

| | | | | |
|---|---|---|---|---|
| 5,097,528 A | * | 3/1992 | Gursahaney et al. | 379/93.23 X |
| 5,522,089 A | * | 5/1996 | Kikinis et al. | 345/864 X |
| 5,673,268 A | * | 9/1997 | Sharma et al. | 455/557 X |
| 5,797,089 A | * | 8/1998 | Nguyen | 455/557 X |
| 6,266,539 B1 | * | 7/2001 | Pardo | 379/93.05 X |
| 6,389,124 B1 | * | 5/2002 | Schnarel et al. | 379/93.23 X |
| 6,647,101 B2 | * | 11/2003 | Rahamim et al. | 379/93.05 |
| 6,754,313 B1 | * | 6/2004 | Quinton et al. | 379/90.01 |

* cited by examiner

*Primary Examiner*—Raymond J. Bayerl
(74) *Attorney, Agent, or Firm*—Berry & Associates P.C.

(57) ABSTRACT

Separate processors, a PDA processor, and a baseband processor are maintained in a PDA having an integrated telephone device. The PDA processor runs PDA related programs and a user interface for the telephone device. A link between the PDA processor and baseband processor transfers data and commands from the user interface to a phone control program executing on the baseband processor. The base band processor is connected to the telephone device, and the phone control program controls operation of the telephone device. The separation of processors reduces vulnerability of the telephone device to hacker rogue applications that invade or program crashes that occur on the PDA processor.

21 Claims, 8 Drawing Sheets

METHOD AND APPARATUS FOR INTEGRATING PHONE AND PDA USER INTERFACE ON A SINGLE PROCESSOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to user interfaces. The invention is more particularly related to user interfaces for phone and Personal Digital Assistants (PDAs). And, the invention is yet more particularly related to combining phone and PDA user interfaces on a single processing device.

2. Discussion of Background

Personal computer systems and their applications have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, palmtop computers, electronic organizers and other handheld devices, commonly known as personal digital assistants (PDA's), have been introduced. The PDA is a computer that is small enough to be handheld or placed in a pocket, and allows a user and run various applications including personal information management applications such as address books, daily organizers, etc. These applications make people's lives easier.

The most popular brand of PDA is the Palm™. However, the Palm™ is much more than a simple PDA. A basic configuration of the Palm™ 100 is shown in FIG. 1. This small, slim, device, about the size of your wallet, can hold 6000 addresses, 5 years of appointments, 1500 to-do items, 1500 memos, 200 e-mail messages, and can run many different software applications.

The front of the Palm™ 100 is a large LCD screen 110 which is touch-sensitive and allows a user to enter and manipulate data. A stylus (not shown) is provided with the Palm™ to help in making touch screen inputs. By using the stylus (or another handheld pointer) to interact with a touch-sensitive screen, a palmtop user can easily navigate through a host of built-in programs, software, and other applications.

Today, the Palm™, PDA and other handheld computing devices offer Internet connectivity capabilities, as well as a vast array of hardware and software choices. Palmtops have evolved from simple organizers into a new kind of handheld that people use to instantly manage all kinds of information, from email, to medical data, to stock reports.

Mobile telephones (cell phones, PCS, satellite phones, etc) are also common tools in today's world. Many cell phones include rudimentary functionality for maintaining call lists, or phone book information, to help alleviate the burdens associated with managing contacts and tracking phone numbers.

However, despite the great capabilities and conveniences of the modern PDA, and the cell phone, many innovations are needed for expanding the capabilities and for increasing the convenience of using PDAs and cell phones.

SUMMARY OF THE INVENTION

The present inventors have realized that the integration of mobile telephone technology into a PDA is one area where innovations are greatly needed to improve the performance, convenience, and usability of PDA and/or other devices having mobile telephone capabilities. The present inventors have also realized that the integration of cell phones into a PDA have some drawbacks that make operation of the combined devices less efficient. For example, a PDA having an integrated cell phone has more processing capability than needed, if the cell phone is simply added to the PDA. A PDA having integrated cell phone capability which uses a single processor to run both the cell phone and PDA is subject to invalid, spurious, rogue, or hacker initiated signals if the PDA processor runs user programs and controls the radio functions of the cell phone.

The present invention is a PDA or other electronic device having integrated cell phone technology. The user interfaces for the cell phone and the PDA are run on a single main processor (PDA processor, for example). A second, phone control processor controls the radio functions of the cell phone. A proprietary link is established for communications between the PDA processor and phone control processor. The proprietary link isolates the phone control processor and radio equipment of the cell phone from spurious commands instituted because of hacker's programs, program crashes, etc., that occur on the PDA processor.

The invention may be embodied as a handheld computer or electronic device comprising, a display screen, a first processor configured to run user applications and send outputs of the user applications to the display screen, the user applications including a telephone user interface configured to capture user inputs for telephone related operations and display current telephone operations information on the display screen, a telephone device, a baseband processor connected to the telephone device and configured to control operations of the telephone device, and a communications link between the first processor and the baseband processor for communicating user inputs and selections from the telephone user interface to the baseband processor.

The invention includes an electronic device comprising display means, a first processing means for running user applications and sending outputs of the user applications to said display screen, said user applications including a user interface means for at least capturing user inputs for telephone related operations and displaying current telephone operations information on said display means, a telephone communication means, a baseband processing means for controlling operations of said telephone communication means, and a link means for communicating data between said first processing means and said baseband processing means, said data including user inputs and selections from said user interface means to said baseband processing means.

The present invention includes a method of operating an electronic device having an integrated telephone device, comprising the steps of, running a telephone user interface program on a first processing device, running a telephone device control program on a second processing device, communicating user data and actions from the telephone user interface program to the telephone device control program via a communications link between the first processor and the second processor, and controlling operation of the integrated telephone device via the telephone device control program according to the user data and actions communicated.

Portions of the present invention may be conveniently implemented on a general purpose computer, such as a modern PDA, Palm™, cell phone, satellite phone, or networked computers, and the results may be displayed on an output device connected to any of the general purpose, PDA, Palm™, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
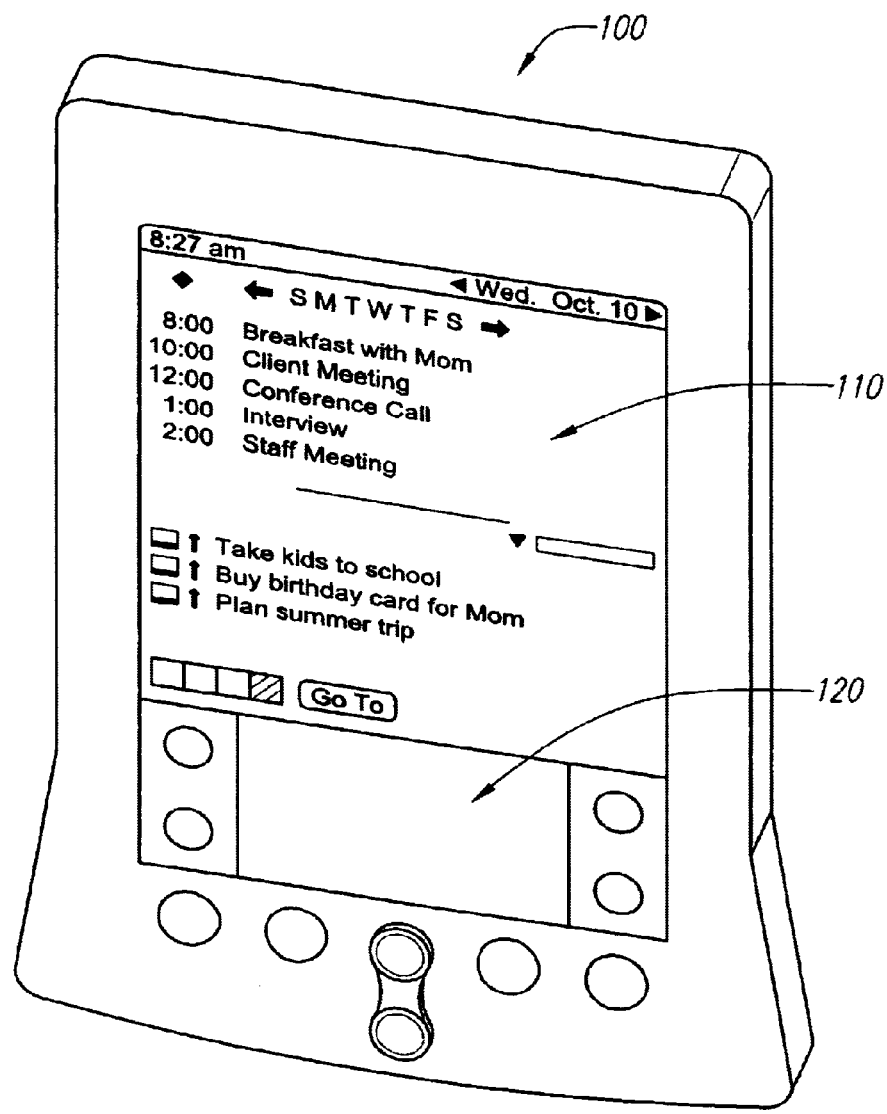
FIG. 1 is a Palm™ handheld computer.
Figure 2:
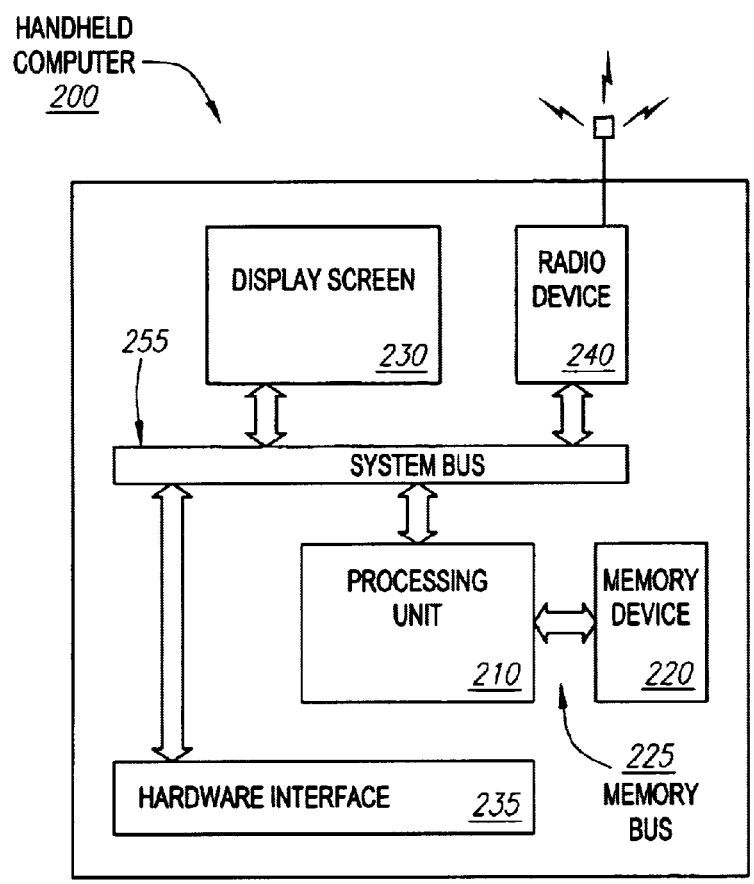
FIG. 2 is a block diagram of selected components of a possible design integrating cell phone technology into a PDA device.

Referring again to the drawings, wherein like reference numerals designate identical or corresponding parts, and more particularly to FIG. 2 thereof, there is illustrated a block diagram of selected components of a handheld computer 200 that includes cell phone technology. The handheld computer 200 includes a processing device 210, for executing applications and an operating system of the computer 200, a memory device 220 for storing the operating system, data, and the applications. A memory bus 255 is utilized to transfer programs and data from memory to the processing unit 210.

A display screen 230 is provided (preferably a touch sensitive screen) for display of Operating System prompts, buttons, icons, application screens, and other data, and for providing user inputs via tapping or touching (or drawing in the Graffiti™ area 120) via a stylus or other touch mechanism. Hardware interface 235 connects to physical hard buttons and switches located on a body of the computer 200 and provides signals to applications running on the processing unit 210.

A mobile radio device 240 provides connectivity to a cellular telephone network (not shown). A system bus 255 carries data and commands to/from the processing unit 210 from/to other devices within the computer 200. For example, user applications running on the computer 200 send application screens and other data outputs to display screen 230 for display via the system bus 255. User inputs (Graffiti™ area drawing, or tap selection, for example) are detected by the screen 230 and sent to the processing unit 210 via the system bus 255.

In addition to the operating system and user selected applications, another application, a phone device, executes on the processing unit 210. Phone calls from the network directed toward the mobile radio device 240 are detected by the mobile radio device and sent, in the form of an incoming call notification, to the phone device (executing on the processing unit 210). The phone device processes the incoming call notification by notifying the user by an audio output such as ringing (not shown).

The phone device also includes a method for the user to answer the incoming call. For example, tapping on a phone icon, or pressing a hard button designated or preprogrammed for answering a call signals the phone device to send instructions (via system bus 255) to the mobile radio device 240 to answer the call.

Outgoing calls are placed by a user by entering digits of the number to be dialed and pressing a call icon, for example. The dialed digits are sent to the mobile radio device 240 along with instructions needed to configure the mobile radio device 240 for an outgoing call. The instructions may include, for example, 1. Access a base station, 2. Send digits, 3. Retrieve and forward ring indication (if any), 4. Connect call, 6. manage call, and 7. await further instructions. Many other instructions may be utilized. For example, in the AT command set more than 100 commands are available. Similar instructions may be sent for handling an incoming call by the phone device after receiving and processing an incoming call indication from the mobile radio device 240.

The mobile radio device 240 is a device configured send signals on exact frequency requirements (FCC certified, for example). Base stations that communicate with the mobile radio device 240 are also precision devices sending and receiving on specified radio frequency channels. One difficulty arising with the design as shown in FIG. 2 is that application program crashes on processor 210 can cause unwanted or inconsistent signals to be generated on system bus 255 and potentially causing problems with the mobile radio device 240, such as spurious radio emissions. In addition the design of FIG. 2 also is susceptible to hacker or rogue programs that may be executing on processing unit 210, also potentially causing spurious radio emissions from mobile radio device 240. The potential spurious emissions, might, for example, cause radio broadcasts in an unintended or unapproved frequency range, potentially cause problems at one or more base stations (unintentionally causing a base station re-boot, for example), or cause interfere with other mobile radio devices.

Figure 3:
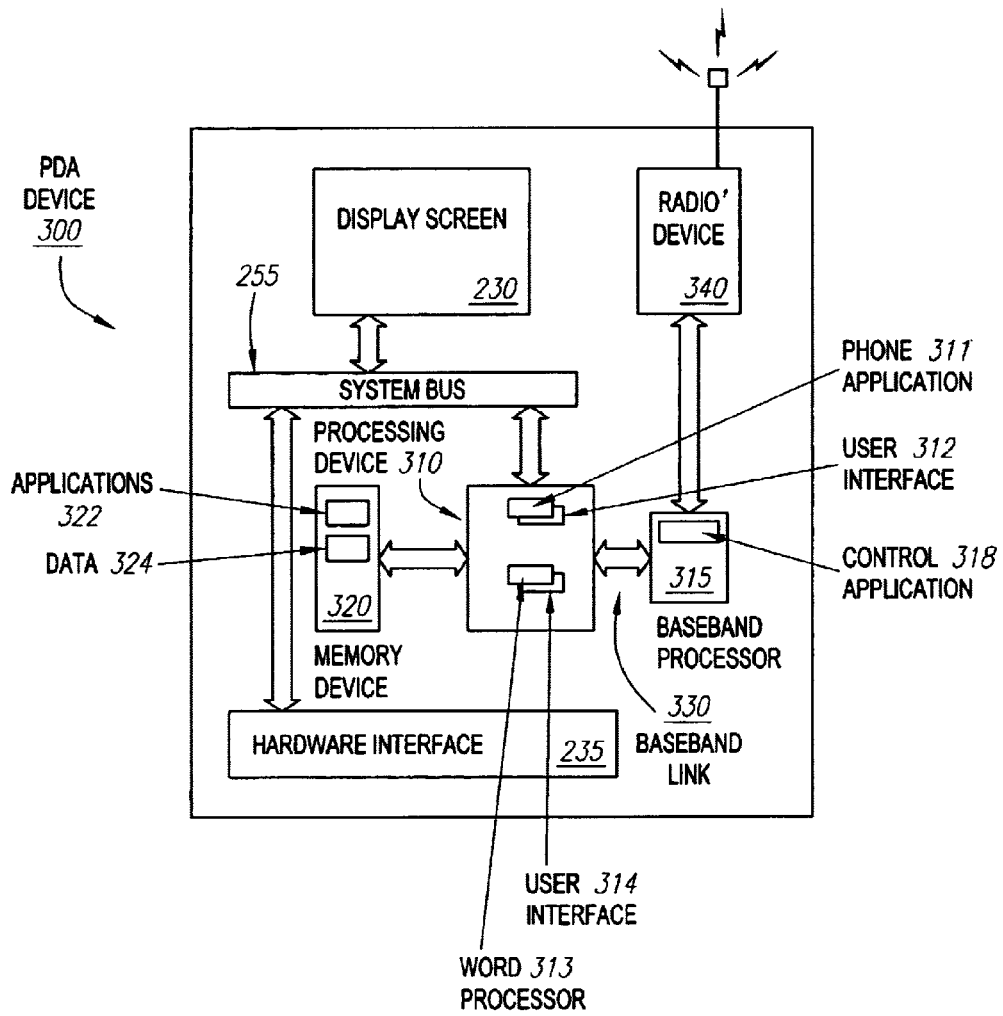
FIG. 3 is a block diagram of selected components of a design according to an embodiment of the present invention for integrating cell phone technology into a PDA device.

FIG. 3 is a block diagram of selected components of a design according to an embodiment of the present invention for integrating cell phone technology into a PDA device 300. The PDA device 300 is a handheld computer such as a Palm™, Palm III™, or Palm V™, or Palm VII™ organizers, manufactured by Palm, Inc. Other embodiments of the invention can include Windows CE™ and Visor™ handheld computers, or other handheld computers and personal digital assistants (PDAs).

Preferably, the PDA 300 has interactive hardware and software that perform functions such as maintaining calendars, phone lists, and at least one voice or audio related functions integrated or attachably integrated (via a connector device, for example, not shown) so as to be configured for use with cellular telephone capabilities of the PDA. Several examples of a configuration and details of connector devices for connecting or integrating voice function devices to a PDA are described in Maes et al., application Ser. No. 09/675,872, entitled, "INTEGRATING VOICE FUNCTION INTO A PDA," filed Sep. 29, 2000, the contents of which are incorporated herein by reference in their entirety.

The software, including a phone user interface, operating system, and other applications (word processors, spreadsheets, databases, etc.) 322 are stored in memory device 320, along with program data, graphics, and other data 324, and executed on a processing device 310. A touch sensitive display device 230 and hard button interface 235 are also provided as similarly discussed above. A system bus 255 provides data, command, and possibly other types of communication, as directed, by any one of the devices, including display screen 230, hardware interface 235, and processing unit 310, to the other devices.

Processing unit 310 runs applications, including the operating system (OS, including a User Interface (UI) of the OS), and other user applications (word processor 313 and word processor user interface 314, for example) as directed by user inputs. The user applications display outputs on the display screen 230 and receive inputs from taps, tap & hold, and writing operations on the display screen and from programmed hard buttons attached to hardware interface 235.

FIG. 3 includes a mobile radio device 340, and a phone control processor 315. The mobile radio device 340 receives instructions and other control data from the phone control processor 315 (also referred to as a baseband processor), implementing those instructions and using the data so as to operate the mobile radio device 340. The phone control (baseband) processor 315 sends instructions and data to the mobile radio device based on programming of a phone control application 318.

A phone application 311 and phone application user interface 312 are provided and execute on the processing unit 310. The main function of the phone application 311 is to service the phone application user interface 312 and transfer required data to and from the phone control application 318 running on the phone control (baseband) processor 315.

A PDA/baseband link 330 is used to communicate data between the phone application 311 (on processing unit 310) and the phone control application 318 (on phone control (baseband) processor 315). The PDA/baseband link 330 is an AT Command interface over a serial link. The PDA/baseband link 330 separates processing performed on processing unit 310 and processing performed on the phone control (baseband) processor 315, providing a separation that reduces chances that a hacker program, other rogue application, or a program crash on the processing unit 310 has any improper influence on the phone control (baseband) processor 315 or the phone control application 318, hence providing a more stable environment for operation of the mobile radio device 340 and assuring no adverse impact on the operation of the cellular network (e.g., preventing unwanted interference signals that could adversely affect other users).

In one embodiment, the AT Command over serial link used on the PDA/baseband link 330 is proprietary to Palm™ and/or utilizes other protocol stacks. In other embodiments, the PDA/baseband link 330 is a parallel interface. In the embodiments using a proprietary link (proprietary protocol and/or proprietary protocol stack), the format of the proprietary link is not particularly important over and above normal protocol considerations (byte economy, ease of use, etc), but keeping the link proprietary assures that rogue applications affecting operation of other PDA devices are unlikely to have any effect on a device according to the present invention. The PDA/baseband link 330 includes a protocol that is updateable by downloading an updated protocol from a vendor web site and installing the updated protocol on each of the processing unit 310 and phone control (baseband) processor 315.

The type of interface used over the PDA/baseband link 330 may be selected based on criteria of the phone control (baseband) processor 315 which may already have communication ports configured for either parallel or serial communications. The selected protocol is a choice between the available protocols for a particular baseband processor, or a protocol that may be developed by the producer of the baseband processor and the producer of a device utilizing the present invention. No advantage in the type of protocol utilized is envisioned, except that an industry standard protocol (such as the AT command interface discussed above) may be more familiar to development engineers implementing a product, and may reduce development time.

Figure 4:
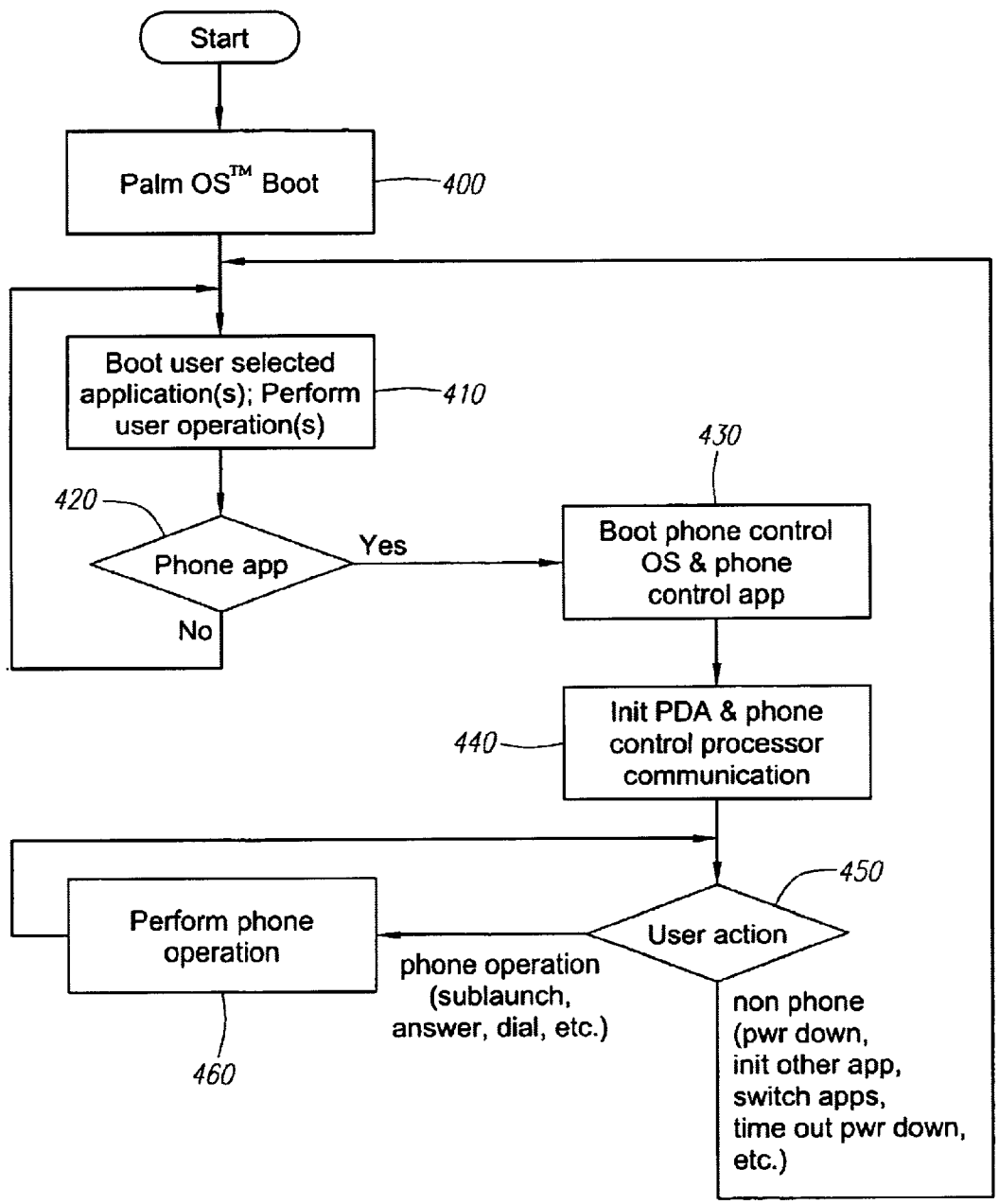
FIG. 4 is a flow chart illustrating process flows of a main PDA processor executing PDA and cell phone user interfaces.

FIG. 4 is a flow chart illustrating process flows of a main PDA processor executing PDA and cell phone user interfaces. At step 400, the system (handheld computers, Palm™, etc.) is powered on and the Palm™ OS is booted. The Palm OS™ is used as an example, other handheld or full service operating systems (NT, Windows, Linux, etc.) may be utilized. Steps 410 and 420 are combination steps.

At step 410 any user operation may be performed (power down, set preferences, arrange icons, etc.) or user selected application (word processor, Internet, etc.) may be invoked and used. Step 420 identifies that the user has selected a phone application that is intended to control mobile phone capabilities built into the system (mobile radio 340, for example).

When the phone application is started, it sends a signal across the PDA/baseband link 330 that signals the phone control OS to boot and start a phone control application that runs on the phone control processor (step 430). Alternatively, the phone control OS is booted upon power up of the system and waits in a hibernation state until a signal is received to start the phone control application. In the former case, an on/off recognizer identifies whether a signal on the PDA/baseband link 330 is an on/off command and boots or shuts down the phone control OS and processor accordingly. In the latter case, the phone control OS recognizes start and shut down commands that are applied to the phone control application.

Once started, the PDA processor unit and phone control processor begin communicating from phone application to phone control application over the PDA/baseband link 330 (step 440). User actions (step 450) controlling PDA functions or directly phone operations (step 460) are implemented.

Figure 5:
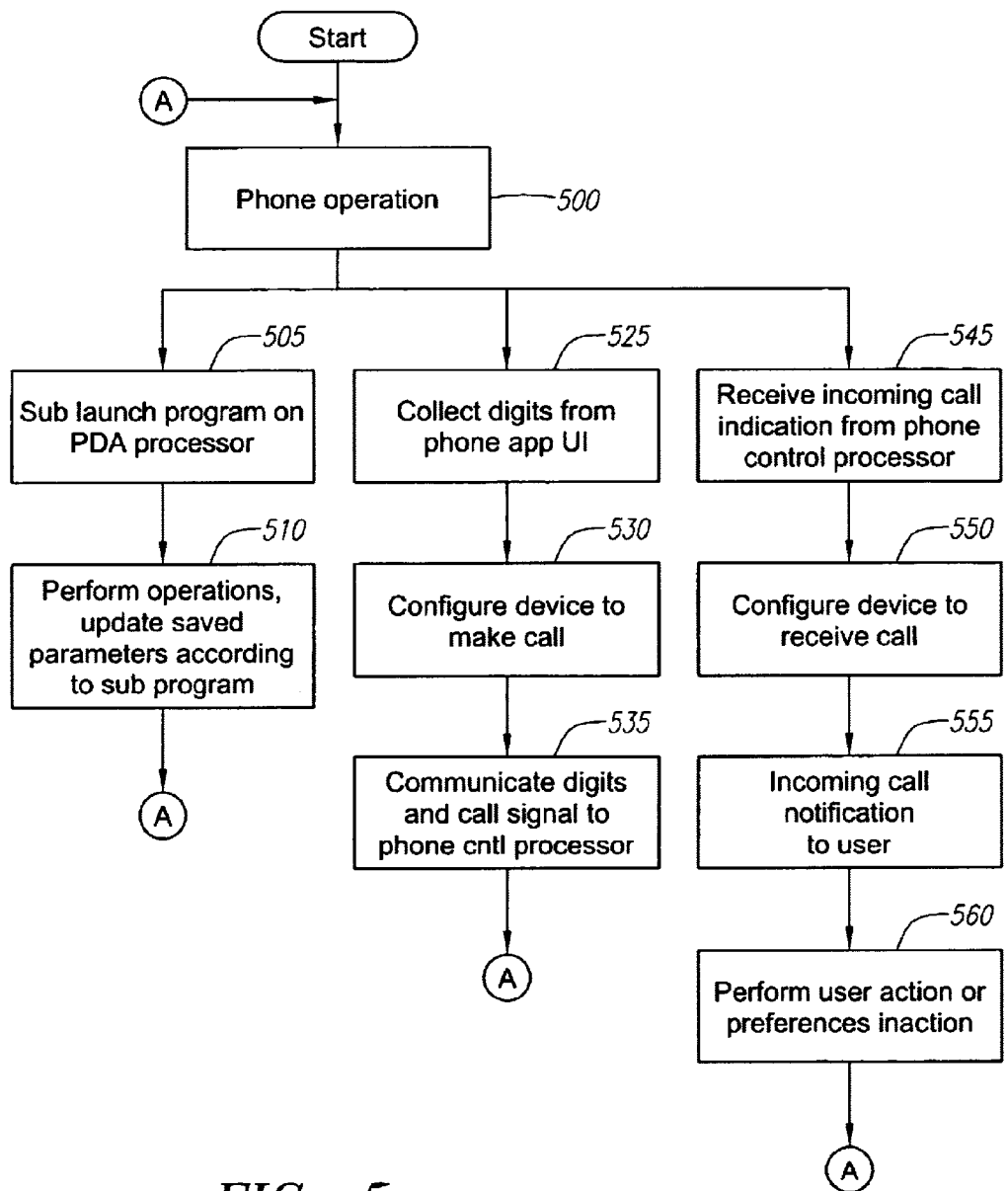
FIG. 5 is a flow chart illustrating an embodiment of process flows of a cell phone user interface and communications of the cell phone user interface to a phone control processor according to the present invention.

FIG. 5 is a flow chart illustrating some example phone operations. The user initiates various phone operations (step 500) by tapping phone application icons, graphics, enters control data into the Graffiti™ area, or other input method attached keyboard, hard buttons, etc.). Phone operations may include, for example, sub-launching a phone related application (step 505) and performing the sub-application processed (sub-launching an address book or note taking function (step 505), and updating/creating an address book entry or taking/updating a note (step 510), for example. One example of a note taking application is described in Maes et al., U.S. Pat. No. 6,442,251, application Ser. No. 09/675, 363, entitled, "METHOD AND APPARATUS FOR TAKING A NOTE WHILE IN A CALL," filed Sep. 29, 2000, the contents of which are incorporated herein by reference in their entirety.

Another example phone operation is making a call, illustrated in steps 525–535. First, the phone application collects digits entered by the user via the phone application user interface (running on PDA processing unit 310) (step 525). A step of sending a wake up or configuration signal (step 530) to the phone control application (running configuration signal (step 530) to the phone control application (running on phone control processor 315) may be performed to "wake" the phone control application 318 (in the case where the phone control application 318 is in a sleep mode from a period of in-operation, for example) and signal the phone control application 318 to configure the mobile radio device 340 so as to be ready to make a call (power up, awake form sleep, etc.). Step 530 may be performed as soon as the phone application knows that a call is being made, such as up on phone application boot, or when a first digit of a phone number is received (as in step 525, for example). At step 535, the digits collected at step 525 are communicated from the phone application to the phone control application, signaling the phone control application to initiate a call to that number.

Another example phone application is receiving an incoming call as illustrated in steps 545–560. At step 545, an incoming call indication is received by the phone application from the phone control application (running on ph call processor). At step 550, the phone application is configured to receive the call (set up audio channels, "wake" phone applications, etc.). At step 555, the phone application presents an incoming call notification to the user (ringing, vibration, visual display, combination, etc.). Finally at step 560, a user acts to answer the call (presses a talk button or icon, for example), which directs the phone application to connect the call, or, a user acts to send the call to voicemail (or ignore), by pressing an end button or icon, for example. Alternatively, if a user does nothing, the call is left unattended (call directed to voicemail by network, for example), or, if the user has preferences set, the preferences are used to direct operations of the phone application. Examples of user preferences for directing phone operations during periods of user inaction (and other conditions, such as how to notify a user of an incoming call) are described in Maes et al.; application Ser. No. 09/675,874, entitled, "METHOD AND APPARATUS FOR SETTING AND USING USER PREFERENCES," filed Sep. 29, 2000, the contents of which are incorporated herein by reference in their entirety.

Figure 6:
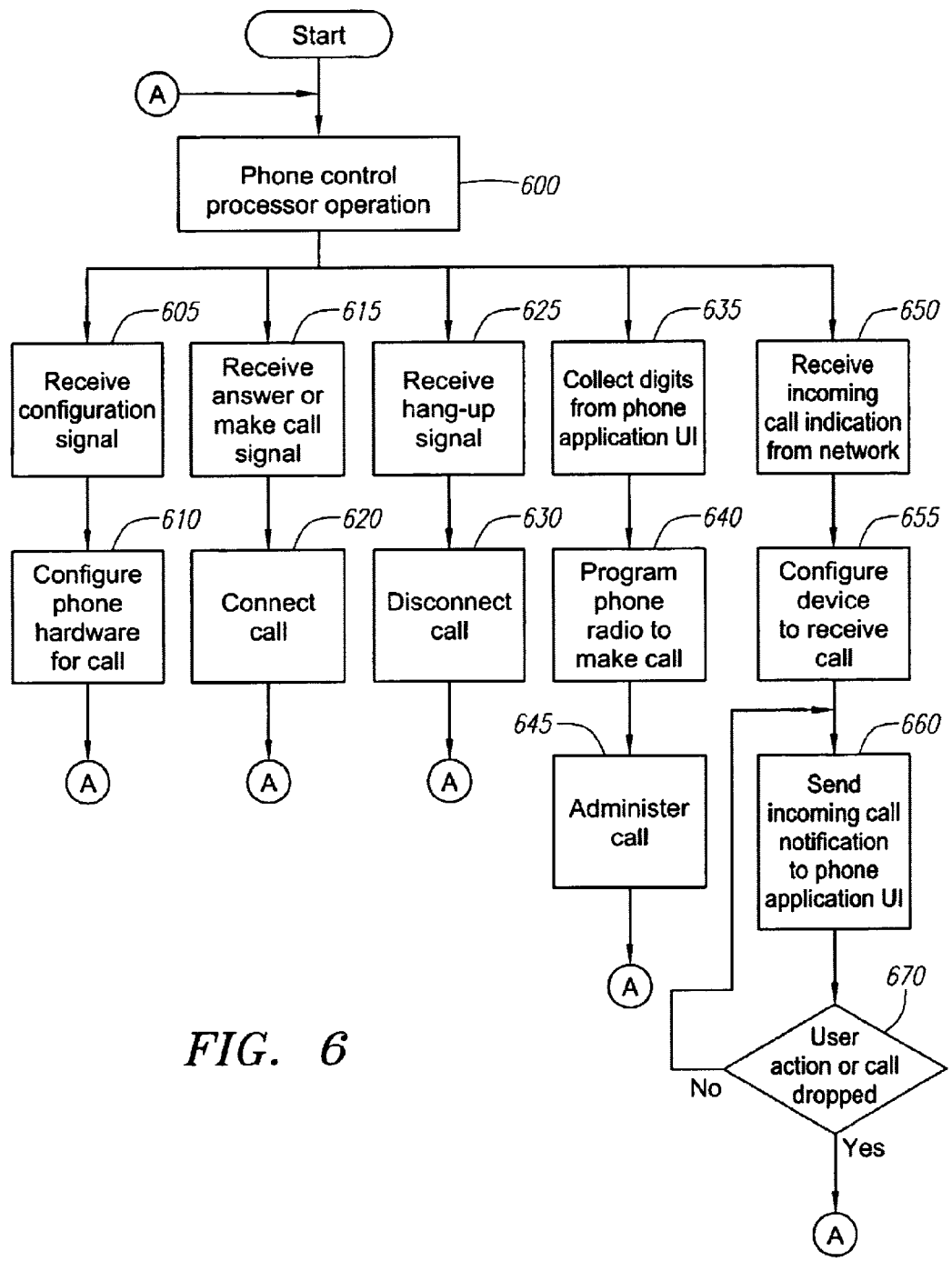
FIG. 6 is a flow chart illustrating an embodiment of a phone control program according to the present invention.

FIG. 6 is a flow chart illustrating an embodiment of a phone control program according to the present invention. Several processes are shown, as sequential processes initiated by an event or control signal. One example operation, configuring the mobile radio device 340 to make a call, is initiated, for example, by a control signal received (step 605) via the PDA/baseband link 330 from the phone application. The phone control processor 315 performs the configuration (step 610). Another example includes signals received by the phone control processor directing it to answer a call (step 615), and the operations of the control processor needed to connect the call (step 620) are performed. Similarly, a signal may be received to hang-up a current call (step 625), and the phone control processor disconnects the current call accordingly (step 630).

Another example operation of the phone control processor is shown in steps 635–645, for making a call. The phone control processor receives a communication from the phone application having the digits of a user entered telephone number (step 635), the phone control processor programs the mobile radio device 340 to contact a base station and initiate the call (step 640), and the phone control application administers (performs any functions needed to maintain the connection) the call (step 645).

A final example operation, answering an incoming call, is illustrated in steps 650–670. An incoming call indication is received from the network (step 650). The phone control processor configures the mobile radio device to answer the call (step 655) and sends an incoming call notification to the phone application (step 660). If a user action prompted action message (hang-up, send to voicemail, or answer, for example) is returned from the phone application, a phone control application process is then initiated (downstream from connector A) to perform that process. If no user action is occurs, the incoming call notification is resent (no branch of step 670).

Alternatively, the phone application is pre-programmed to continue any ringing (or other notification) until a lost call signal is received from the phone control application indicating that there is no longer an incoming call (already diverted to voice mail by the network, or caller hung-up, for example). The above processes are examples, and other features or processes may also be performed by the phone control processor (periodic network checks, or sending network ID information to the phone application, for example).

Figure 7:
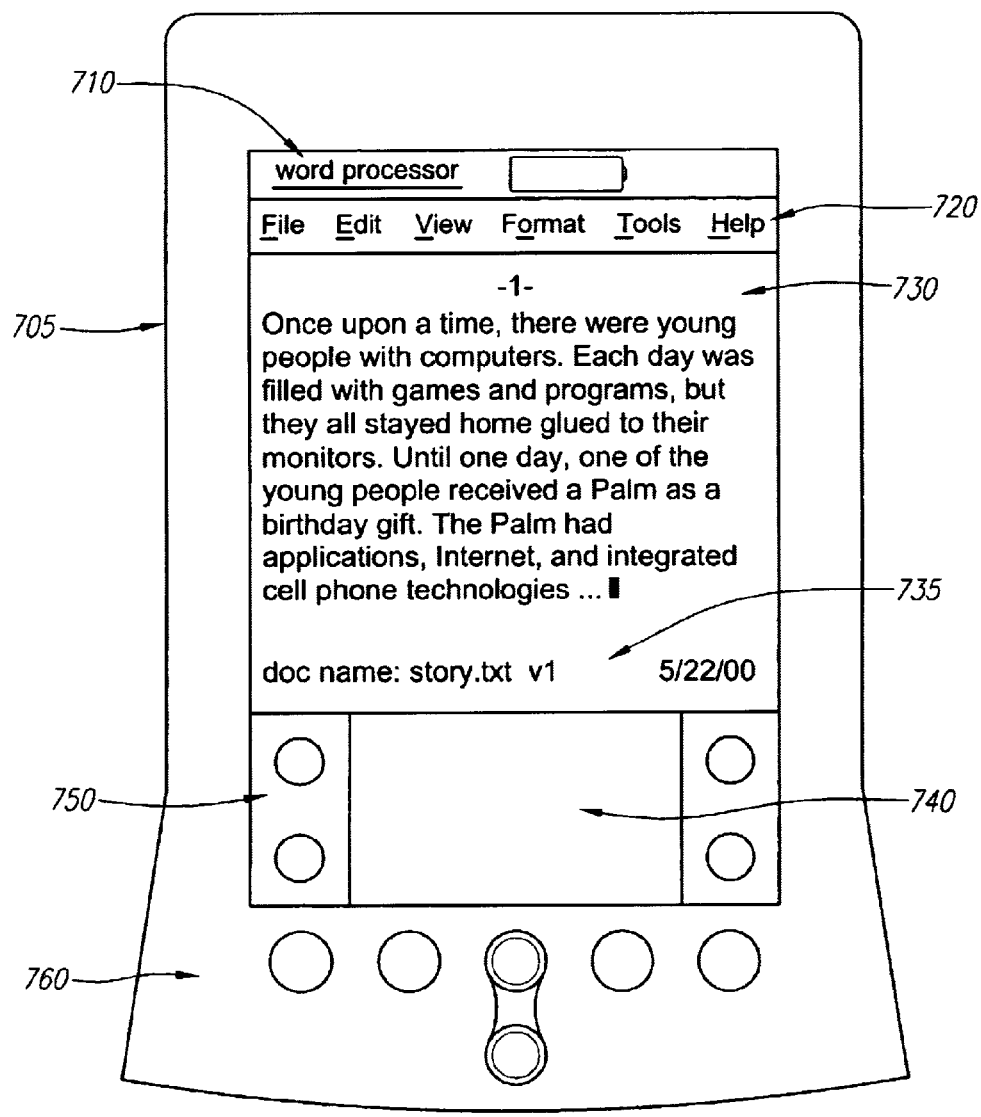
FIG. 7 is an electronic device running a PDA application according to an embodiment of the present invention.

FIG. 7 is an electronic device running an example PDA application according to an embodiment of the present invention. The example PDA application is a word processor 705 that runs on processing unit 310. The word processor includes an identification banner 710, a set of pull down menus 720 for file management and other features of the word processor 705. The document being processed 730 is displayed, and user inputs are received via tapping the touch sensitive screen, writing or other actions in the Graffiti™ area 740, tapping virtual buttons 750, or pressing one or more hard buttons 760 (some of which may be connected via Hardware interface 235 and programmed for initiating a specific function of the word processor, for example). The document being processed is saved as story1.txt (as shown by document identifier 735) in memory device 320.

Figure 8:
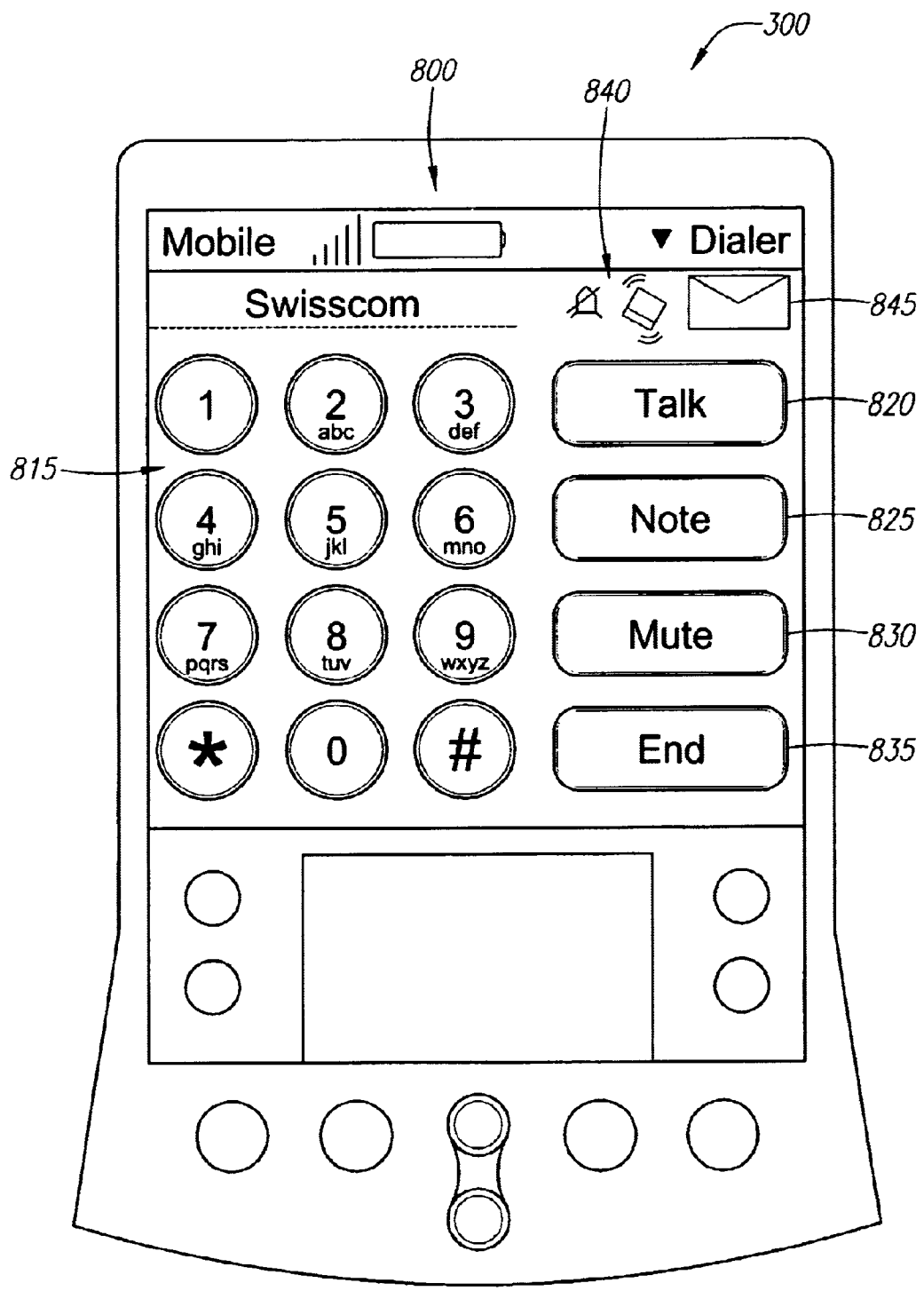
FIG. 8 is an electronic device running a phone application according to an embodiment of the present invention.

Concurrently hosted on the Palm™ (or electronic or computer device) 300 is the phone application. An example phone application 800 is shown in FIG. 8. The phone application 800 includes a dialer screen 815 that includes keypad digits 1–9, *, and #, and a set of operation keys. The operation keys include Talk 820, Note 825, Mute 830, and End 835. In one embodiment, user activation of the Talk key 820 initiates a phone call of previously entered digits, or answers an incoming call. User activation of the Mute key 830 mutes the caller at the other end of the line (other caller), which keeps the other caller from hearing any conversation initiated at the users side of the call. User activation of the End key 835 terminates the call that the user is currently participating, or immediately transfers an incoming call to voicemail (or other options as specified in user preferences, for example). Other functions may be assigned or programmed into the keys, and additional or alternative keys and functions may also be provided. The Palm OS™ (or other operating system) decides which of the concurrent applications is currently being executed on the processing device 310, the remain application(s) in an inactive state.

While on a call, the Note key 825 activates an in-call note taking service, allowing the user to take notes about the call and return to the dialer screen for control of other telephone options after completing the note. Details of a note options are described in co-pending U.S. patent application No. 09/675,363, entitled "METHOD AND APPARATUS FOR IN A PHONE CALL," filed Sep. 29, 2000, the contents of which are incorporated by reference in their entirety.

A voicemail flag 845 (envelope icon, for example) indicates a voicemail or other message (short messaging service, for example) received by the phone application or network administering the telephone capabilities of the Palm™ 300. Ringer preferences are shown as two icons 840 (a bell with a line drawn through it, and a vibrator icon) illustrating the current options for notification of incoming calls. Either the bell icon or vibrator icon may be tapped to change the status of the option. For example tapping the bell with a line drawn through it changes it to bell without a line. Tapping the vibrator icon changes it to a no vibrate icon. In this manner, user preferences, or options, may be changed. The phone application 810 is one example of a phone application that may be utilized in conjunction with the present invention. However, it should be understood that variations and/or other phone applications may be utilized.

FIGS. 7 and 8 illustrate concurrent applications, and their respective user interfaces, executing on the processing unit 310. However, control of the mobile radio device 340 is maintained by the phone control processor, and the phone control application. In effect, separating user applications and interfaces and the phone application user interface from having any influence over the operation of the phone control application, thereby isolating the phone control application for any ill effects of a rogue application or program crash on the processing unit 310.

Although the present invention has been described using the specific example of integrating phone and PDA user interfaces on one processor and maintaining phone control on a separate processor, the invention may be applied to applications other than phone and PDA based systems. For example, combining a wireless internet device (replacing 340) and another electronic device (e.g., PDA, electronic inventory system, etc.), or any other wireless communication system and another electronic device, each having a user interface.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, placing and receiving telephone calls, transferring audio and voice data, serial, parallel and proprietary communications between processors, user interfaces, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An electronic device comprising:
   a display screen;
   a first processor configured to run user applications and send outputs of the user applications to said display screen, said user applications including a telephone user interface configured to capture user inputs for telephone related operations and display current telephone operations information on said display screen;
   a telephone device;
   a baseband processor connected to said telephone device and configured to control operations of said telephone device; and
   a communications link between said first processor and said baseband processor for communicating user inputs and selections from said telephone user interface to said baseband processor;
   wherein said communications link is a proprietary protocol stack.

2. The electronic device according to claim 1, wherein said communications link is an AT Command interface over a serial link.

3. The electronic device according to claim 1, wherein said communications link is a parallel interface.

4. The electronic device according to claim 1, wherein:
   said baseband processor comprises,
   a baseband processing unit, and
   a phone control program configured to execute on said baseband processing unit;
   said first processor includes a user interface program configured to retrieve user inputs; and
   said phone control program is configured to, receive data communicated across the communications link, and control operations of said telephone device.

5. The electronic device according to claim 4, wherein said data communicated across the communications link includes data identifying any of phone numbers, data setting network user preferences, and call actions, including any of answer call, make call, and hang-up call.

6. The electronic device according to claim 4, wherein:

said phone control program is further configured to send data identifying current conditions of said telephone device to the user interface program.

7. The electronic device according to claim 6, wherein said current conditions include any of incoming calls, incoming call caller id information, network status, and indications of network voicemails received.

8. The electronic device according to claim 1, wherein:

said electronic device is a PDA; and said telephone device is a cellular radio integrated within said PDA.

9. An electronic device comprising:

a display screen;

a first processor configured to run user applications and send outputs of the user applications to said display screen, said user applications including a telephone user interface configured to capture user inputs for telephone related operations and display current telephone operations information on said display screen;

a telephone device;

a baseband processor connected to said telephone device and configured to control operations of said telephone device; and a communications link between said first processor and said baseband processor for communicating user inputs and selections from said telephone user interface to said baseband processor;

wherein said communications link includes a protocol that is updateable by downloading an updated protocol from a vendor web site and installing the updated protocol on each of said first processor and said baseband processor.

10. The electronic device according to claim 9, wherein the electronic device comprises a wireless Internet device.

11. The electronic device according to claim 9, wherein the baseband processor comprises a phone control program that boots up upon power-up of the electronic device and waits in a hibernation state until a signal is received to start the phone control program.

12. The electronic device according to claim 9, wherein the baseband processor is configured to wake phone applications when an incoming call is received.

13. A method of operating an electronic device having an integrated telephone device comprising the steps of:

running a telephone user interface program on a first processing device;

running a telephone device control program on a second processing device;

communicating user data and actions from the telephone user interface program to the telephone device control program via a communications link between the first processor and the second processor;

controlling operation of the integrated telephone device via said telephone device control program according to the user data and actions communicated; and updating the communications link by, downloading a protocol utilized by the communications link, and installing the downloaded protocol in each of the telephone user interface program and the telephone device control program.

14. The method according to claim 13, further comprising the steps of:

communicating conditions of the telephone device, via said communications link, to the telephone user interface program; and displaying the conditions of the telephone device on a display of the electronic device.

15. An electronic device comprising:

display means;

a first processing means for running user applications and sending outputs of the user applications to said display screen, said user applications including a user interface means for at least capturing user inputs for telephone related operations and displaying current telephone operations information on said display means;

a telephone communication means;

a baseband processing means for controlling operations of said telephone communication means; and a link means for communicating data between said first processing means and said baseband processing means;

wherein:

said link means is a proprietary protocol stack; and said data including user inputs and selections from said user interface means to said baseband processing means.

16. The electronic device according to claim 15, wherein said link means is an AT Command interface over a serial link.

17. The electronic device according to claim 15, wherein said link means is a parallel interface.

18. The electronic device according to claim 15, wherein:

said baseband processing means includes a phone control program;

said first processing means includes a user interface program configured to retrieve user inputs and communicate data related to the user inputs to said phone control program via said link means; and said phone control program is configured to, receive data communicated across said link means, and control operations of said telephone device based on the communicated data.

19. The electronic device according to claim 18, wherein said data communicated across said link means includes data identifying any of phone numbers, data setting network user preferences, and call actions, including any of answer call, make call, and hang-up call.

20. The electronic device according to claim 15, wherein:

said electronic device is a PDA; and said telephone communication means is one of a cellular radio, PCS, and satellite phone.

21. An electronic device comprising:

display means;

a first processing means for running user applications and sending outputs of the user applications to said display screen, said user applications including a user interface means for at least capturing user inputs for telephone related operations and displaying current telephone operations information on said display means;

a telephone communication means;

a baseband processing means for controlling operations of said telephone communication means; and a link means for communicating data between said first processing means and said baseband processing means;

wherein:

said link means includes a protocol that is updateable by downloading an updated protocol from a vendor web site and installing the updated protocol on each of said first processing means and said baseband processing means; and said data including user inputs and selections from said user interface means to said baseband processing means.

* * * * *

(12) INTER PARTES REEXAMINATION CERTIFICATE (817th)
United States Patent
Vertaschitsch et al.

(10) Number: US 6,976,217 C1
(45) Certificate Issued: Feb. 10, 2014

(54) METHOD AND APPARATUS FOR INTEGRATING PHONE AND PDA USER INTERFACE ON A SINGLE PROCESSOR

(75) Inventors: Ed Vertaschitsch, Bellevue, WA (US); Sean Mercer, Issaquah, WA (US); Gordon Onorati, Kent, WA (US)

(73) Assignee: Access Co., Ltd., Sarugaku-Cho, Chiyoda-Ku, Tokyo (JP)

Reexamination Request:
No. 95/002,290, Sep. 14, 2012

Reexamination Certificate for:
Patent No.: 6,976,217
Issued: Dec. 13, 2005
Appl. No.: 09/687,987
Filed: Oct. 13, 2000

(51) Int. Cl.
*G06F 3/00* (2006.01)
*H04M 11/00* (2006.01)

(52) U.S. Cl.
USPC ...... 715/717; 715/771; 715/864; 379/110.01; 379/90.01; 379/93.19; 379/93.23; 455/556.1; 455/575.1

(58) Field of Classification Search
None
See application file for complete search history.

(56) References Cited

To view the complete listing of prior art documents cited during the proceeding for Reexamination Control Number 95/002,290, please refer to the USPTO's public Patent Application Information Retrieval (PAIR) system under the Display References tab.

*Primary Examiner* — Minh Dieu Nguyen

(57) ABSTRACT

Separate processors, a PDA processor, and a baseband processor are maintained in a PDA having an integrated telephone device. The PDA processor runs PDA related programs and a user interface for the telephone device. A link between the PDA processor and baseband processor transfers data and commands from the user interface to a phone control program executing on the baseband processor. The base band processor is connected to the telephone device, and the phone control program controls operation of the telephone device. The separation of processors reduces vulnerability of the telephone device to hacker rogue applications that invade or program crashes that occur on the PDA processor.

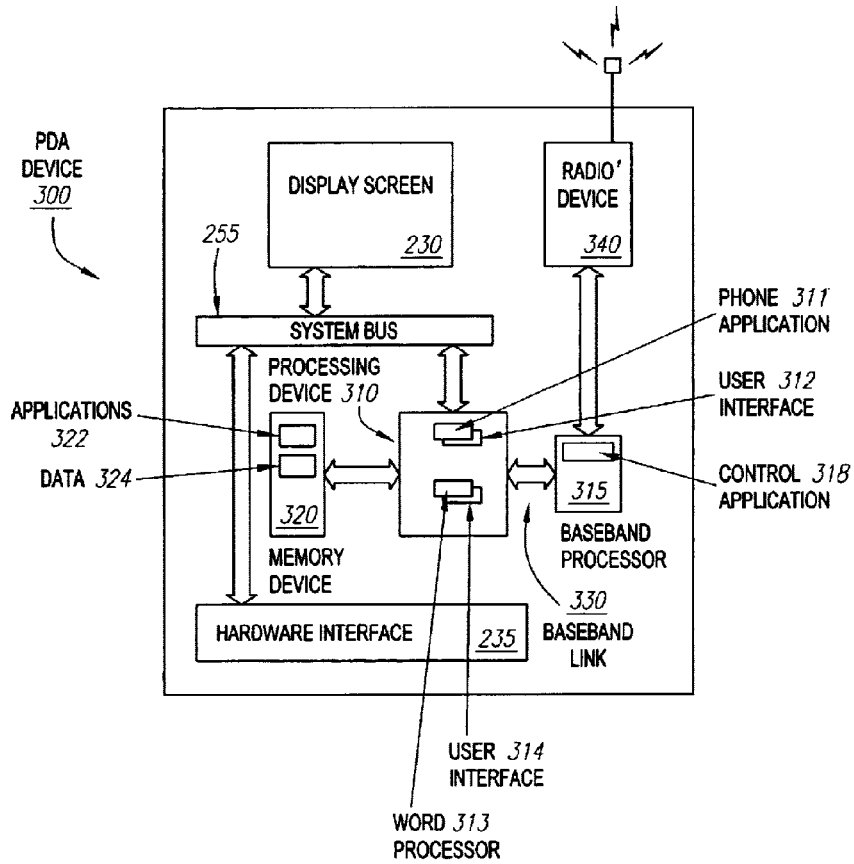

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-8 and 15-20 are cancelled.

New claims 22-31 are added and determined to be patentable.

Claims 9-14 and 21 were not reexamined.

22. *An electronic device, comprising:*
*a display screen;*
*a first processor configured to run user applications and send outputs of the user applications to said display screen, said user applications including a telephone user interface configured to capture user inputs for telephone related operations and display current telephone operations information on said display screen;*
*a telephone device;*
*a baseband processor connected to said telephone device and configured to control operations of said telephone device; and*
*a communications link between said first processor and said baseband processor for communicating user inputs and selections from said telephone user interface to said baseband processor;*
*wherein said communications link comprises a proprietary protocol stack configured to separate processing of said first processor from processing of said baseband processor.*

23. *The electronic device of claim 22, wherein said baseband processor is configured to execute a phone control application.*

24. *The electronic device of claim 23, wherein the phone control application is started when a signal is received by a phone control operating system in hibernation mode.*

25. *The electronic device of claim 23, wherein the user applications comprise a phone application.*

26. *The electronic device of claim 25, wherein, in response to the user inputs for telephone related operations, the phone application is configured to send a signal to the phone control application.*

27. *The electronic device of claim 25, wherein, in response to an incidence received by said telephone device, the phone control application is configured to send a notification to the phone application.*

28. *The electronic device of claim 22, wherein said proprietary protocol stack is further configured to isolate the baseband processor from spurious commands.*

29. *The electronic device of claim 28, wherein the spurious commands are instituted due to hacker's programs occurred on the first processor.*

30. *The electronic device of claim 28, wherein the spurious commands are instituted due to program crashes occurred on the first processor.*

31. *The electronic device of claim 22, wherein said communications link includes a protocol that is updateable by downloading an updated protocol from a vendor web site and installing the updated protocol in the electronic device.*

* * * * *